United States Patent [19]

Chamings

[11] Patent Number: 5,112,177
[45] Date of Patent: * May 12, 1992

[54] FLEXIBLE FASTENER

[76] Inventor: Antony W. Chamings, 2386 Camilla, Troy, Mich. 48083

[*] Notice: The portion of the term of this patent subsequent to May 14, 2008 has been disclaimed.

[21] Appl. No.: 699,982

[22] Filed: May 13, 1991

Related U.S. Application Data

[63] Continuation-in-part of Ser. No. 479,156, Feb. 13, 1990, Pat. No. 5,015,135.

[51] Int. Cl.$^5$ ............................................. F16B 15/00
[52] U.S. Cl. .................................... 411/447; 411/457; 411/903; 24/711
[58] Field of Search ............... 411/446, 447, 457, 461, 411/466, 469, 903, 439, 923; 24/711, 563, 543, 295, 293, 36

[56] References Cited

U.S. PATENT DOCUMENTS

| | | | |
|---|---|---|---|
| 309,414 | 12/1884 | Smith . | |
| 339,769 | 4/1886 | Hayes | 411/457 X |
| 677,509 | 7/1901 | Grove . | |
| 780,019 | 1/1905 | Arendt | 411/457 X |
| 1,252,237 | 1/1918 | Clark . | |
| 1,511,711 | 12/1922 | Atwell . | |
| 2,055,442 | 9/1936 | Jones | 72/118 |
| 2,077,120 | 4/1937 | Lombard | 411/447 |
| 2,092,807 | 9/1937 | Chapelle | 411/902 X |
| 2,129,949 | 9/1938 | Lombard | 411/446 |
| 2,161,632 | 6/1939 | Nattenheimer | 24/711 X |
| 2,352,407 | 8/1943 | Potts | 24/153 |
| 2,390,751 | 11/1943 | Tinnerman | 24/153 |
| 2,580,849 | 5/1949 | Schwartz | 24/86 |
| 3,009,382 | 2/1959 | Salka | 85/16 |
| 3,205,757 | 2/1963 | Kuennen | 85/16 |
| 3,634,178 | 1/1972 | Goodman | 161/7 |
| 4,317,451 | 3/1982 | Cerwin et al. | 411/457 X |
| 4,339,983 | 7/1982 | Okamura et al. | 411/466 |
| 4,719,917 | 1/1988 | Barrows et al. | 411/447 X |
| 5,015,135 | 5/1991 | Chamings | 411/447 |

FOREIGN PATENT DOCUMENTS

| | | | |
|---|---|---|---|
| 725562 | 5/1932 | France | 411/457 |
| 1008863 | 5/1952 | France | 411/457 |
| 2508990 | 1/1983 | France | 411/447 |
| 108166 | 8/1979 | Japan | 411/457 |
| 2184187 | 6/1987 | United Kingdom | 411/903 |

Primary Examiner—Renee S. Luebke
Assistant Examiner—Jerry Redman
Attorney, Agent, or Firm—Weintraub, DuRoss & Brady

[57] ABSTRACT

A flexible retainer which may be used to attach papers and the like to a wall, bulletin board, etc. includes a body formed from flexible material with a spacer section and at least two finger grips extending outwardly away from the spacer section, and at least two pins extending from the body away from the finger grips, the pins normally disposed in a non-parallel configuration so as to define an angle therebetween. The body is deformable to temporarily align the pins in a substantially parallel configuration for insertion thereof into a wall or other surface.

11 Claims, 2 Drawing Sheets

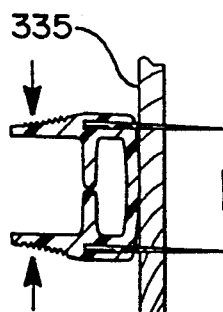
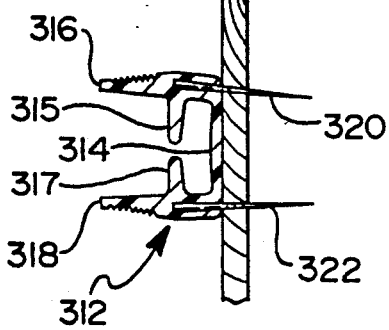
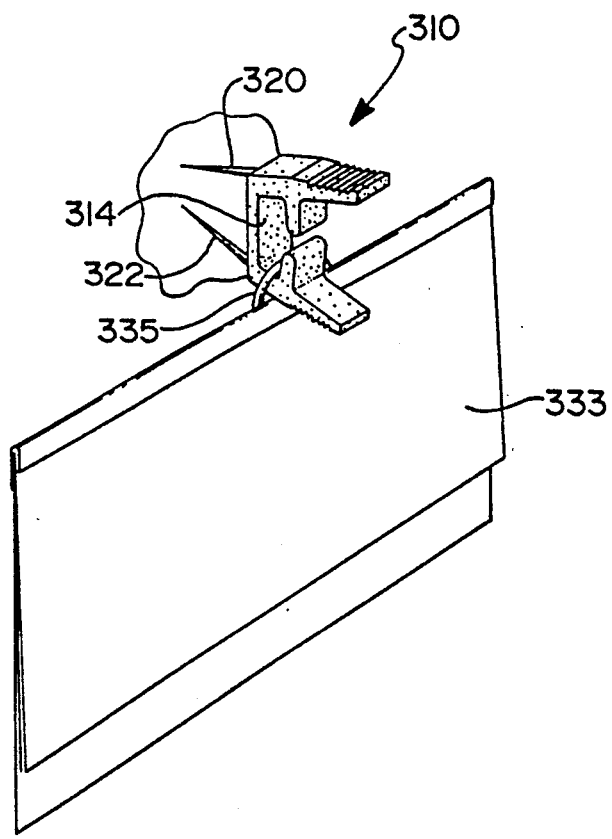
FIG 4
FIG 5
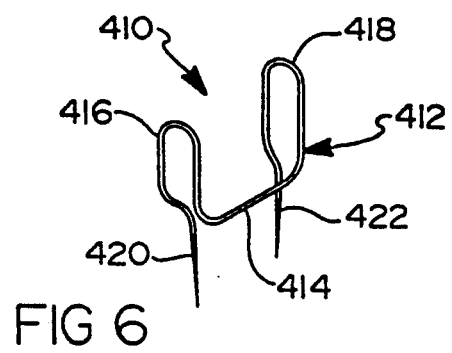
FIG 6

FLEXIBLE FASTENER

CROSS-REFERENCE TO RELATED APPLICATIONS

The present application is a continuation-in-part of copending U.S. application Ser. No. 07/479,156, filed Feb. 13, 1990, which has been granted U.S. Pat. No. 5,015,135. The disclosure of the above-identified application is hereby incorporated by reference.

BACKGROUND OF THE INVENTION

1. Field of the Invention

The present invention relates to a fastener or the like for use in affixing papers or other materials to a generally flat surface such as, e.g., a bulletin board or wall. More particularly, the present invention relates to a flexible fastener or pin which is not easily dislodged.

2. Prior Art

Many types of fasteners or retainers are known and in common use today for mounting papers or the like to a surface. For example, thumb tacks and the like have long been known. One variation of the thumb tack which has become popular in recent years is the "push pin". this type of retainer has a pin extending outwardly from a handle or "push" portion which is graspable by the fingers of the user. Unfortunately, push pins have one inherent drawback, in that, when used in a surface other than cork, they easily fall out of the surface in which they are pressed. For example, if these push pins are used to attach papers or the like to drywall, the push pins may fall out with the subsequent loss of attachment of the paper to the drywall material.

Another common application in which these push pins are less than optimal is in attaching material to divider walls in "modular" offices, which are in common use today. These push pins cannot consistently retain themselves in attachment to the dividing walls that define the modular office.

While the art has devised many fasteners, it is to be appreciated that there has not been, heretofore, a universal fastener of the type under consideration which is applicable to many types of surfaces.

For example, Grove, U.S. Pat. 509 discloses a device for holding two portions of a cloth skirt fastened together. The device of Grove includes a thin flat plate having hooks secured thereto, the hooks being bent in the general shape of fishhooks.

Clark, U.S. Pat. No. 1,252,237 discloses a metal device having four prongs for attaching a price ticket or the like to an article or garment, but which is not applicable to the attachment of papers or the like to a wall or other vertical surface.

Potts, U.S. Pat. No. 2,352,407 discloses a bendable fastener formed from a length of metal wire, and the fastener of Potts is analogous to a staple.

Tinnerman, U.S. Pat. No. 2,390,751 discloses a modified staple adapted to secure a layer to a support. The staple of Tinnerman has a body, the ends of which are provided with integral return bends with downwardly extending legs, the legs being substantially parallel to one another. The device of Tinnerman appears particularly suited for assembling furniture or the like.

Schwartz, U.S. Pat. No. 2,580,849 discloses a fastener for drapery headings and the like. The fastener of Schwartz includes a spring metal strap having prongs or points on opposed ends thereof, paired with a relatively rigid rod or wire having a hook formed therein by bending.

Goodman, U.S. Pat. No. 3,634,178 discloses decorative appliques mountable on articles such as hair brushes, rings, etc. Each applique of Goodman has a pair of projections extending from the back thereof, the projections being substantially parallel to one another. These parallel projections are forced into passages in the article to be decorated, the passages diverging outwardly from a parallel configuration. The divergence of the passages from parallel bends the projections on the applique and creates tension in deforming the projections to retain the applique on the article.

While the prior art discloses various types of fasteners and methods of attaching articles together, a need still exists in the art for a retainer which is usable in mounting papers or the like to a vertical wall, which is insertable into such a wall without passages being previously formed therein, and which is capable of gripping the wall in order to retain itself in an engagement therewith.

SUMMARY OF THE INVENTION

The present invention provides a improved retainer for fastening articles such as paper or the like to walls, bulletin boards, or other surfaces.

A flexible retainer or fastener in accordance with the present invention, generally, comprises:

(a) a body formed from a flexible material, the body having a spacer section;

(b) means for bending the body in response to finger pressure, the bending means being operable to flexibly bend the spacer section when pressure is applied thereto and (c) at least a pair of spaced apart outwardly extending pins, the pins being normally disposed in a non-parallel, converging configuration so as to define an angle therebetween;

wherein the body is deformable to temporarily align the pins in a substantially parallel configuration.

In use the body section is flexed to render the pins substantially parallel, whereupon they are projected into a mounting surface. Upon release of the fastener, the normal bias of the pins towards each other "locks" the fastener in position.

In one embodiment, the body may be formed of nylon.

For a more complete understanding of the present invention, reference is made to the following detailed description section, which should be read in conjunction with the accompanying drawings. Throughout the following description and in the drawings, identical reference numbers refer to the same part shown in multiple figures of the drawings, in which:

BRIEF DESCRIPTION OF THE DRAWINGS

FIG. 4 is a cross-sectional view of a third embodiment hereof in two different orientations;

FIG. 5 is a perspective view of the embodiment of FIG. 4, partially cut away, showing the fastener mounted to a wall and supporting a calendar; and FIG. 6 is a perspective view of a fourth embodiment hereof.

DETAILED DESCRIPTION OF THE PREFERRED EMBODIMENT

Figure 1:
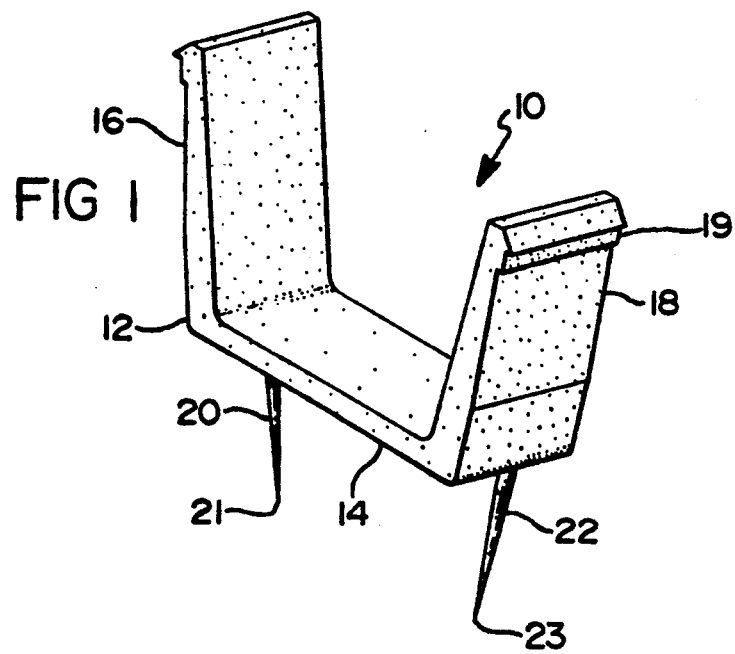
FIG. 1 is a perspective view of a first embodiment of a fastener in accordance with the present invention.

Referring to FIG. 1, a flexible fastener or retainer in accordance with the present invention is shown generally at 10. The retainer 10 includes a body 12 which is formed from a flexible material, such as nylon, another suitable plastic, a rigid elastomer, or the like. Of course, other materials of construction which afford the necessary "springiness" to allow the pins to be rendered parallel may be used.

Figure 2:
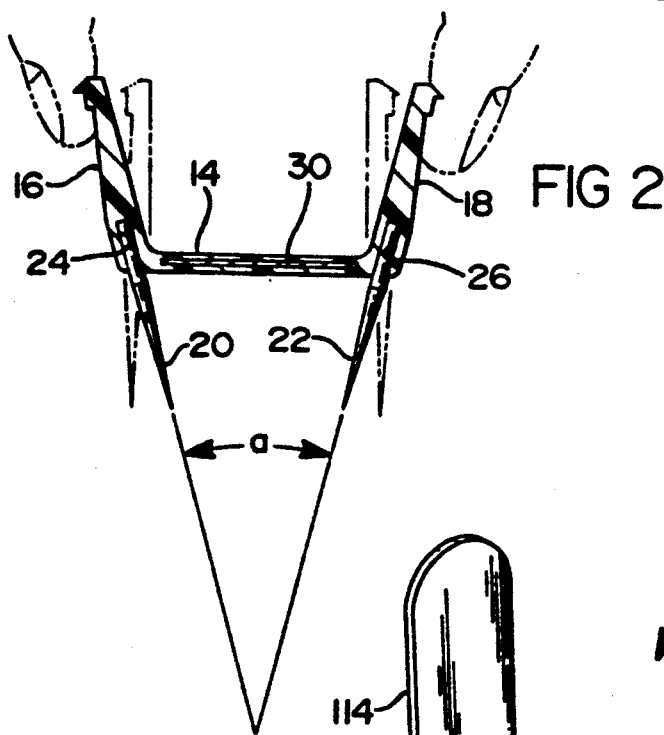
FIG. 2 is a cross sectional view of the embodiment of FIG. 1.

As shown in FIGS. 1-2, the body 12 includes a substantially horizontal spacer section 14 for spacing a pair of pins 20, 22 longitudinally apart from one another. The spacer section 14 may, optionally, have a flat piece of spring steel 30 embedded therein for importing structural rigidly to the retainer. Two finger grips 16, 18 extend upwardly away from the opposite ends of the spacer section 14, and may be formed integrally as part of the body 12, as shown in the drawing. The finger grips, 16, 18 are for grasping by a user of the retainer 10, as shown in FIG. 2. The finger grips 16, 18 may have notches 19 thereon, or may be otherwise textured, to facilitate grasping thereof. The finger grips 16, 18 provide a means for bending the body 12 in response to finger pressure.

The pins 20, 22 are fixedly mounted in hollow cavities 24, 26 provided in opposite ends of the body 12 for that purpose, and may be cast in place in the body 12. The cavities 24, 26 may be cylindrical, square, triangular, or other appropriate shapes to accommodate the pins 20, 22. The pins 20, 22 may be formed of steel, stainless steel, or other material. The pins 20, 22 extend outwardly from the body in a direction substantially away from the finger grips 16, 18. The pins each end in a point 21, 23, respectively, for penetrating a surface (not shown) for mounting.

A particularly novel feature of the present invention is that the pins 20, 22 are normally disposed in the body 12 in a non-parallel, inwardly converging configuration, so as to define an acute angle "a" therebetween, as shown in FIG. 1.

The body 10 is deformable, as shown in phantom in FIG. 2, to temporarily align the pins 20, 22 in a substantially parallel configuration for insertion thereof into a wall bulletin board or similar structure. Inward pressure on the finger grips 16, 18 tends to flexibly bend the spacer section 14 as the pins 20, 22 are moved outwardly. This flexible bending of the spacer section is particularly apparent in the embodiment illustrated in FIG. 4, but is not limited thereto. The retainer 10 is pressed through a medium to be mounted and into a mounting surface with the pins 20, 22 held in a substantially parallel configuration. Once pressure of the fingers of the user on the finger grips 16, 18 is released with the pins 20, 22 inserted in a wall or the like, the spacer section 14 tends to flex back towards its original configuration, thus, placing an inward pressure on the pins 20, 22. This inward pressure acts to securely retain the fastener 10 of the present invention in engagement with the wall or other surface.

In other words, once the flexing pressure is released, the pins 20, 22 are urged back toward their normally angularly inclined relationship. This angular bias, therefore, locks the fastener or retainer in place. Thus, any papers or the like affixed therewith are placed into position on the mounting surface. The retainer 10 of the present invention may be used in stretching and mounting skins during drying and/or curing thereof. Another possible use for the retainer 10 of the present invention is to mount it sideways in a wall and use it as a picture having hook. In this case, the lower finger grip may, optionally, be cut down to a shorter length. An additional advantage of the present invention is that a piece of paper may be mounted squarely to a wall with a single fastener 10.

Figure 3:
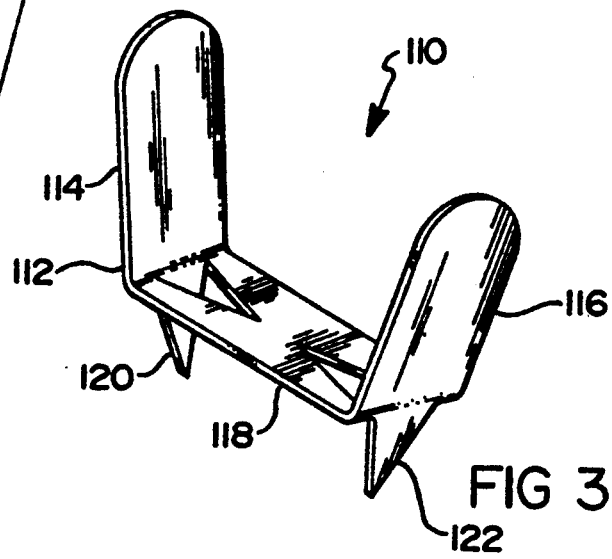
FIG. 3 is a perspective view of a second embodiment hereof.

Referring now to FIG. 3, there is depicted therein an alternate embodiment of the present fastener or retainer, generally, denoted at 110. In accordance herewith the retainer 110 comprises a unitary body 112 having a pair of upstanding finger grips or grasping members 114, 116 which are interconnected by a bight portion or spacer section 118 to define a generally, U-shaped body.

A pair of spaced apart pins 120, 122, depend outwardly from the bight section 118, as shown. The pins 120, 122 are normally angularly inclined with respect to each other, as in the first embodiment hereof.

In forming the pins 120, 122, they may be punched out from the bight section via a punch press or the like. This is especially advantageous where forming the retainer from a suitable metal such as steel or the like.

As in the first embodiment, the retainer 110 is used by flexing the grips 114, 116 toward each other to align the pins 120, 122 in a substantially parallel manner. Thereafter, the pins are projected through an article to be mounted, and therefrom into a mounting surface. Release of the finger grips 114, 116 causes the pins 120,122 to be urged toward each other, thereby securely mounting an article or articles onto the mounting surface.

Referring now to FIGS. 4 and 5, a third embodiment 310 of the present invention is shown mounted vertically in a wall and supporting a calendar 333. In this embodiment, the retainer 310 includes a body 312 which is formed form a flexible plastic material. A preferred plastic material for use in forming the body is a commercially available plastic sold under the mark "DELRIN". The body 312 includes a substantially horizontal spacer section 314 for spacing a pair of pins 320, 322 longitudinally apart from one another. Two finger grips 316, 318 extend outwardly away from the opposite ends of the spacer section 314, and may be formed integrally as part of the body 312, as shown in the drawing. As in the first embodiment, the finger grips 316, 318 are provided for grasping thereof by a user of the retainer 310. The finger grips 316, 318 provide a means for binding the body 312 in response to the finger pressure.

In this embodiment, a pair of integrally cast stops, 315, 317 extend inwardly from the finger grips 316, 318 to provide a convenient and quick way to determine when the body 312 has been sufficiently deformed for the pins 320, 322 to be aligned in a parallel configuration. In addition, when the fastener 310 hereof is mounted vertically on a wall as shown in FIG. 5, the lowermost of the two stops 315, 317 may be used as a retainer to receive a hook or hanging means 335 in the space immediately behind the stop. In a similar fashion, a coat hanger (not shown), picture, or other article may be suspended from the fastener 310 in this embodiment.

FIG. 4 illustrates, at the top portion thereof, the fastener 310 with the body 312 deformed to such an extent that the stops 315, 317 are in contact with one another, at which point the spacer section 314 is bent into a curved shape in response to inward pressure on the finger grips in the direction of the arrows in the figure. With the body thus deformed, the pins 320, 322 are parallel. With the fastener 310 in this condition, it is inserted into a wall 335 until the body 312 contacts the wall 335, at which point the pressure on the finger grips 316, 318 is released and the pins 320, 322 then return somewhat to a non-parallel configuration, as shown on the bottom section of FIG. 4. This non-parallel configuration of the pins 32, 322 helps to snugly retain the fastener 310 in the wall 335 for an extended period of time.

Referring now to FIG. 6, a fourth embodiment 410 is shown which is formed completely from a single piece of stiff deformable wire. The fastener 410 in this embodiment includes a spacer section 414 which serves to space a pair of pins 420, 422 apart from one another. The pins 420, 422 in this embodiment are also normally disposed in a non-parallel configuration so as to define an angle therebetween, as in the previous embodiments. A pair of finger grips 416, 418 extend upwardly and away from the pins 420, 422 for grasping thereof by a user to temporarily deform the body 412 to place the pins in a parallel configuration for insertion thereof into a substrate. Due to the relatively stiff nature of the wire from which the body 412 is formed, when the finger grips 416, 418 are released, the pins 420, 422 tend to exert inward pressure when released to securely maintain the fastener 410 in a wall or other substrate.

Although the present invention has been described herein with respect to a specific embodiment thereof, it will be understood that the foregoing description is intended to be illustrative, and not restrictive. Many modifications of the present invention will occur to those skilled in the art. All such modifications which fall within the scope of the appended claims are intended to be within the scope and spirit of the present invention.

Having, thus, described the invention, what is claimed:

1. A flexible fastener, comprising:
   (a) a body formed form a flexible material, the body having a spacer section;
   (b) means for bending the body in response to finger pressure, the bending means being operable to flexibly bend the spacer section when pressure is applied thereto; and
   (c) at least a pair of spaced apart outwardly extending pins, the pins being normally disposed in a non-parallel converging configuration so as to define an angle therebetween;
   wherein the body is deformable to temporarily align the pins in a substantially parallel configuration.

2. The fastener of claim 1, wherein the body is formed of nylon.

3. The fastener of claim 1, further comprising a piece of spring steel disposed in the spacer section of the body.

4. The fastener of claim 1, wherein the means for bending comprises a pair of finger grips extending outwardly away from the spacer section for grasping by a user.

5. The fastener of claim 4, wherein the finger grips are textured to facilitate grasping thereof.

6. The fastener of claim 4, wherein the finger grips are integrally formed as part of the body.

7. A flexible fastener, comprising:
   (a) a body formed from a flexible material, the body having a spacer section;
   (b) a pair of finger grips for bending the body in response to finger pressure, the finger grips extending outwardly away from the spacer section;
   (c) at least a pair of spaced apart outwardly extending pins, the pins being normally disposed in a non-parallel converging configuration so as to define an angle therebetween; and,
   (d) a pair of stops which extend toward one another medially on the finger grips for limiting the travel of the finger grips toward one another;
   wherein the body is deformable to temporarily align the pins in a substantially parallel configuration.

8. A flexible fastener, comprising:
   (a) a body formed from a flexible material, the body having a spacer section;
   (b) a pair of finger grips for bending the body in response to finger pressure, the finger grips extending outwardly from the spacer section; and
   (c) at least a pair of spaced apart outwardly extending pins, the pins being normally disposed in a non-parallel converging configuration so as to define an angle therebetween;
   wherein the body is deformable in response to movement of the finger grips toward one another to temporarily align the pins in a substantially parallel configuration.

9. The fastener of claim 8, further comprising a pair of stops which extend toward one another medially on the finger grips for limiting the travel of the finger grips toward one another.

10. A flexible fastener, comprising:
    (a) a body formed from a flexible material, the body having a spacer section;
    (b) a pair of finger grips for bending the body in response to finger pressure, the finger grips extending outwardly from the spacer section; and
    (c) at least a pair of spaced apart outwardly extending pins, the pins being substantially straight and disposed in a non-parallel converging configuration so as to define an angle therebetween, the pins extending outwardly from the body in a direction substantially away from the finger grips;
    wherein the body is deformable in response to movement of the finger grips toward one another to align the pins in a substantially parallel configuration.

11. The fastener of claim 10, further comprising a pair of stops which extend toward one another medially on the finger grips for limiting the travel of the finger grips toward one another.

* * * * *